March 27, 1934.  G. J. ESSELEN  1,952,664
WOOD TREATMENT AND PRODUCT
Filed Dec. 16, 1931
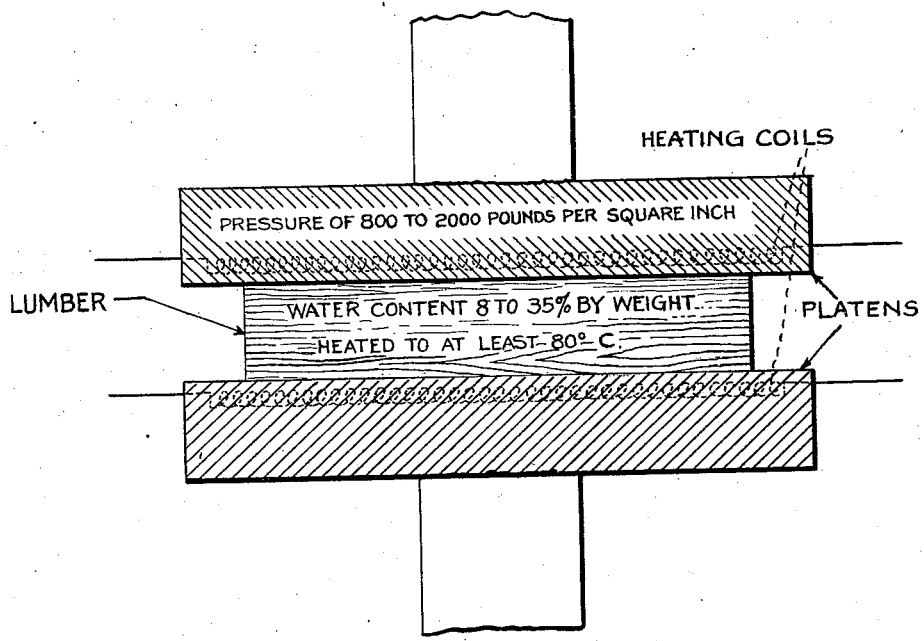
INVENTOR:
G. J. Esselen
BY H. L. Kirkpatrick
ATTORNEY Patented Mar. 27, 1934

1,952,664

UNITED STATES PATENT OFFICE 1,952,664

WOOD TREATMENT AND PRODUCT

Gustavus J. Esselen, Swampscott, Mass., assignor to Potlatch Forests, Inc., Lewiston, Idaho, a corporation of Maine Application December 16, 1931, Serial No. 581,523

3 Claims. (Cl. 144—309)

This invention relates to an improved and novel process of wood treatment and the product of such process.

Any of the commonly used kinds of lumber, whether hard or soft wood, can be processed and thereby greatly improved, besides being given qualities and characteristics which the natural lumber, from which the hereindescribed novel product is made, does not originally possess. For example, lumber can, by this process, be made denser, harder, heavier, stronger, tougher, more resistant to wear or abrasion, somewhat more fire-resistant, and improved in grain and texture.

By the method of this invention lumber can be made to weigh whatever amount is desired from the original weight of the natural lumber up to a maximum of from 90 to 95 pounds per cubic foot. The resulting product, when finished with wax, shellac or varnish for example, has a beautiful and lustrous appearance peculiar to itself which greatly improves appearance and enhances its beauty. These qualities and characteristics combine to make the final or finished product especially well adapted for use as flooring, cabinet wood, interior trim or finish for buildings, and for various specialty uses.

The invention involves the treatment of lumber by moisture, heat and pressure as hereinafter described. I have discovered that the above mentioned desirable characteristics can be readily imparted to lumber of controlled and definite moisture (water) content by mechanically compressing and at the same time subjecting the lumber to a softening influence by heating it, with the contained water, to a temperature of at least 100° C. and preferably somewhat in excess thereof. I have found in practice that by treating lumber having the proper moisture content, and subjecting it to gradually increasing and carefully controlled temperatures and pressure, as hereinafter described, the final or finished product may be quickly and readily made to weigh 50 to 90 pounds per cubic foot, or up to a maximum of about 95 pounds per cubic foot. I have also found that there is a general and more or less constant relation between the density, weight or specific gravity of the final or finished product and its hardness, strength, toughness and ability to withstand wear or abrasion. For example, if natural lumber, having an ovendry weight of 30 pounds per cubic foot, is processed and compressed until it weighs 60 pounds per cubic foot, the product will then ordinarily be at least two times harder, stronger, tougher, and more wear resistant than the natural lumber was originally.

The invention involves the processing or treatment of wood or lumber which has been brought to a moisture content of between 8% and 35% of the ovendry weight of the wood, by the application to the wood, having said moisture content, of controlled heat and pressure for certain predetermined periods of time. It has been found practicable to use natural lumber which has been slowly and partially air-dried, preferably to a moisture content of between 15% and 35% of its ovendry weight. Lumber, which either by kiln-drying or subjecting to elevated temperatures or by any method has been dried to a moisture content of less than 8% (varying somewhat with the kind of wood), does not lend itself readily to treatment in accordance with this invention. This is especially true of Pacific coast, or Douglas fir.

The preferred method of carrying out the process of this invention is as follows:

Lumber, in ordinary board form, having a moisture content of between 15% and 35% of its ovendry weight, is placed in a hydraulic press [though other suitable apparatus may be employed] so that pressure may be applied to the side surfaces in a direction transverse to the length of the board or boards in the press. The platens of the press should have a temperature not to exceed 60° to 80° C. at the time. Enough pressure should be applied to the lumber to prevent it from warping—say 100 pounds per square inch—and the lumber is then allowed to attain substantially the same temperature as that of the heated platens; that is to say, about 60° to 80° C. The temperature of the platens is then increased slowly so that the lumber between the platens gradually attains a higher temperature as the process proceeds. When the temperature of the lumber has reached 90° to 100° C., pressure may be applied gradually, uniformly and in such manner that the desired maximum pressure will have been attained about the time the maximum pre-determined temperature is reached. In most cases and with most species of natural lumber the maximum temperature of the lumber should not exceed 150° C. for the extreme high temperatures tend to char the wood and drive off too much of the moisture, some of which should remain in the final product in order that it possesses the desired characteristics. The temperature is ordinarily 120° C.–150° C. this being dependent upon the finished product desired. When the maximum pre-determined temperature and pressure have been attained in the press, the temperature of the platens and of the lumber therebetween, is reduced as rapidly as practicable to 70° C. and preferably to about 60° C., maintaining full, maximum pressure throughout the cooling period. When the product has become cooled, while still under maximum pressure, to 60°–70° C., or less, it may be taken out of the press.

Assuming that a board of ordinary soft, coniferous wood (e. g. Douglas fir) of the above specified moisture content is to be so treated that the final product will weigh about 80 pounds per cubic foot, [which is about the oven-dry weight of lignum vitæ] the following table indicates the approximate temperature-time-pressure relation which should preferably be maintained as nearly as operating conditions permit:

| Temperature—centigrade | Time—minutes | Pressure—pounds per square inch |
|---|---|---|
| 80° | 0 | 100 |
| 90° | 4 | 300 |
| 100° | 8 | 480 |
| 110° | 12 | 660 |
| 120° | 16 | 840 |
| 130° | 20 | 1,020 |
| 140° | 24–36 | 1,200 |
| 60°–70° | (Sufficient to cool) | 1,200 |

I have found that it is better not to increase the heat or pressure too rapidly or suddenly so that the fibers of the wood may be given time in which to readjust and rearrange themselves and with the minimum strain. No harm will be done to the wood if temperature and pressure are increased less rapidly than indicated above; but temperature and pressure should not be increased much more rapidly than indicated if the best results and product are sought.

The accompanying drawing is a diagrammatic sectional view showing a piece of lumber of moisture content between 8 and 35% by weight, in position between the platens of a press. Means comprising electric resistance coils are shown for heating the platens, although any other suitable heating means may be employed. The lumber is shown during that stage of the process during which it is heated to a temperature of at least 80° C. A pressure of 800 to 2000 pounds per square inch may be applied to the lumber.

When soft woods, like the Western conifers are treated in accordance with this invention they may be reduced to from one-half to one-third of their original thickness or volume and will then weigh from 60 pounds to 90 pounds per cubic foot, depending somewhat on the species of woods so processed and treated and the extent to which the process is carried. The final or finished product may be planed, edged, matched or run to pattern on any standard wood working machine, yielding a wonderfully dense, close-grained and uniformly finished product. Such material can be machine surfaced to an extreme variation in finished dimension of not over 1/100 of an inch as there is not the tendency so common in natural lumber for the material to "suck up" and expand immediately after the knives have passed over it. The product can be sawn, planed, bored and worked in any other way with ordinary carpenter's tools.

Having described my invention what I wish to claim and secure by Letters Patent is:—

1. The process of treating lumber which consists in providing lumber having a water content of at least 8% by weight, heating said lumber to a temperature of at least 100° C., maintaining the lumber at a temperature of at least 100° C. meanwhile mechanically compressing the same in a direction transverse to its length until the lumber is substantially reduced in volume, the temperature being gradually increased simultaneously with the increase in pressure, and then while maintaining a heavy pressure thereon cooling the lumber to a temperature less than 80° C.

2. The method of converting lumber into a denser product which consists in providing as the lumber to be treated, a lumber having a moisture content of between 10 and 35% of the oven-dry weight of said lumber, mechanically compressing the lumber in a direction transverse to its length by increasing the pressure thereon while increasing the temperature to at least 100° C. whereby the cross section is materially reduced and a portion only of said moisture driven therefrom, maintaining heavy pressure upon said lumber while reducing the temperature of the same to less than 80° C., and then releasing the pressure upon the same.

3. The method of converting lumber into a denser product which consists in providing as the product to be treated, a lumber having a moisture content of between 10 and 35% of the oven dry weight of said lumber, heating said lumber while under pressure to a temperature exceeding 80° C., then mechanically compressing the lumber in a direction transverse to its length by increasing the pressure thereon to 1000–2000 pounds per square inch while gradually raising the temperature to at least 100° C., whereby the cross section is materially reduced, maintaining the pressure upon said lumber while reducing the temperature of the same to less than 80° C., and then releasing the pressure upon the same.

GUSTAVUS J. ESSELEN.